United States Patent
Bhat et al.

(10) Patent No.: US 11,566,738 B2
(45) Date of Patent: Jan. 31, 2023

(54) FLUID COUPLINGS

(71) Applicant: Colder Products Company, Roseville, MN (US)

(72) Inventors: Yogesh Mohan Bhat, Bengaluru (IN); Elizabeth J. Langer, Minneapolis, MN (US); Grant A. Wilhelm, Plymouth, MN (US)

(73) Assignee: Colder Products Company, Roseville, MN (US)

( * ) Notice: Subject to any disclaimer, the term of this patent is extended or adjusted under 35 U.S.C. 154(b) by 0 days.

(21) Appl. No.: 17/406,651

(22) Filed: Aug. 19, 2021

(65) Prior Publication Data

US 2022/0065376 A1 Mar. 3, 2022

Related U.S. Application Data

(60) Provisional application No. 63/071,009, filed on Aug. 27, 2020.

(51) Int. Cl.
*F16L 33/02* (2006.01)
*F16L 37/138* (2006.01)

(52) U.S. Cl.
CPC .............. *F16L 37/138* (2013.01); *F16L 33/02* (2013.01)

(58) Field of Classification Search
CPC ......... F16L 37/138; F16L 33/02; F16L 33/30; F16L 43/00
See application file for complete search history.

(56) References Cited

U.S. PATENT DOCUMENTS

| | | | |
|---|---|---|---|
| 2,675,829 A * | 4/1954 | Livers | F16L 37/36 |
| | | | 285/322 |
| 2,784,987 A | 3/1957 | Corcoran | |
| 3,394,950 A * | 7/1968 | Jensen | F16L 37/1215 |
| | | | 285/35 |
| 4,275,907 A | 6/1981 | Hunt | |
| 4,398,757 A | 8/1983 | Floyd et al. | |
| 4,451,069 A | 5/1984 | Melone | |
| 5,029,904 A | 7/1991 | Hunt | |
| 5,437,650 A | 8/1995 | Larkin et al. | |

(Continued)

FOREIGN PATENT DOCUMENTS

DE 2307876 A1 * 9/1973
EP 0340194 A1 * 11/1989

(Continued)

OTHER PUBLICATIONS

International Search Report and Written Opinion in International Appln. No. PCT/US2021/046677, dated Dec. 6, 2021, 12 pages.

(Continued)

*Primary Examiner* — Zachary T Dragicevich
*Assistant Examiner* — James A Linford
(74) *Attorney, Agent, or Firm* — Fish & Richardson P.C.

(57) ABSTRACT

This document describes fluid coupling devices for fluid handling systems. For example, some embodiments described in this document relate to fluid coupling devices that snap together, and are then secured to each other using a collar and collet mechanism. Some fluid coupling devices described herein are well suited for use in systems that provide fluid cooling for heat generating devices such as computer hardware. The fluid coupling devices described herein are also suitable for many other uses.

17 Claims, 15 Drawing Sheets

(56) References Cited

U.S. PATENT DOCUMENTS

| | | |
|---|---|---|
| 5,676,405 A | 10/1997 | Reed |
| 8,944,091 B2 | 2/2015 | Sakraschinsky et al. |
| 9,255,453 B1 | 2/2016 | Jennings |
| 10,047,890 B2 | 8/2018 | Li |
| 2015/0001844 A1 | 1/2015 | Tiberghien et al. |
| 2018/0180208 A1 | 6/2018 | Tiberghien et al. |
| 2018/0274705 A1 | 9/2018 | Buerli et al. |
| 2019/0137021 A1 | 5/2019 | Downs et al. |

FOREIGN PATENT DOCUMENTS

| | | | | |
|---|---|---|---|---|
| EP | 2749805 | | 5/2016 | |
| EP | 3379129 A1 | * | 9/2018 | ............ F16L 33/225 |
| FR | 360241 A | * | 4/1906 | |
| FR | 2644223 A1 | * | 9/1990 | |

OTHER PUBLICATIONS

VOSS Automotive GmbH [online], "VOSS quick connect system 246 NX," posted on YouTube, Feb. 9, 2017, retrieved on Oct. 21, 2021, <https://www.youtube.com/watch?v=ax9rJEGFAAc>, 156 pages [Video Submission].

\* cited by examiner

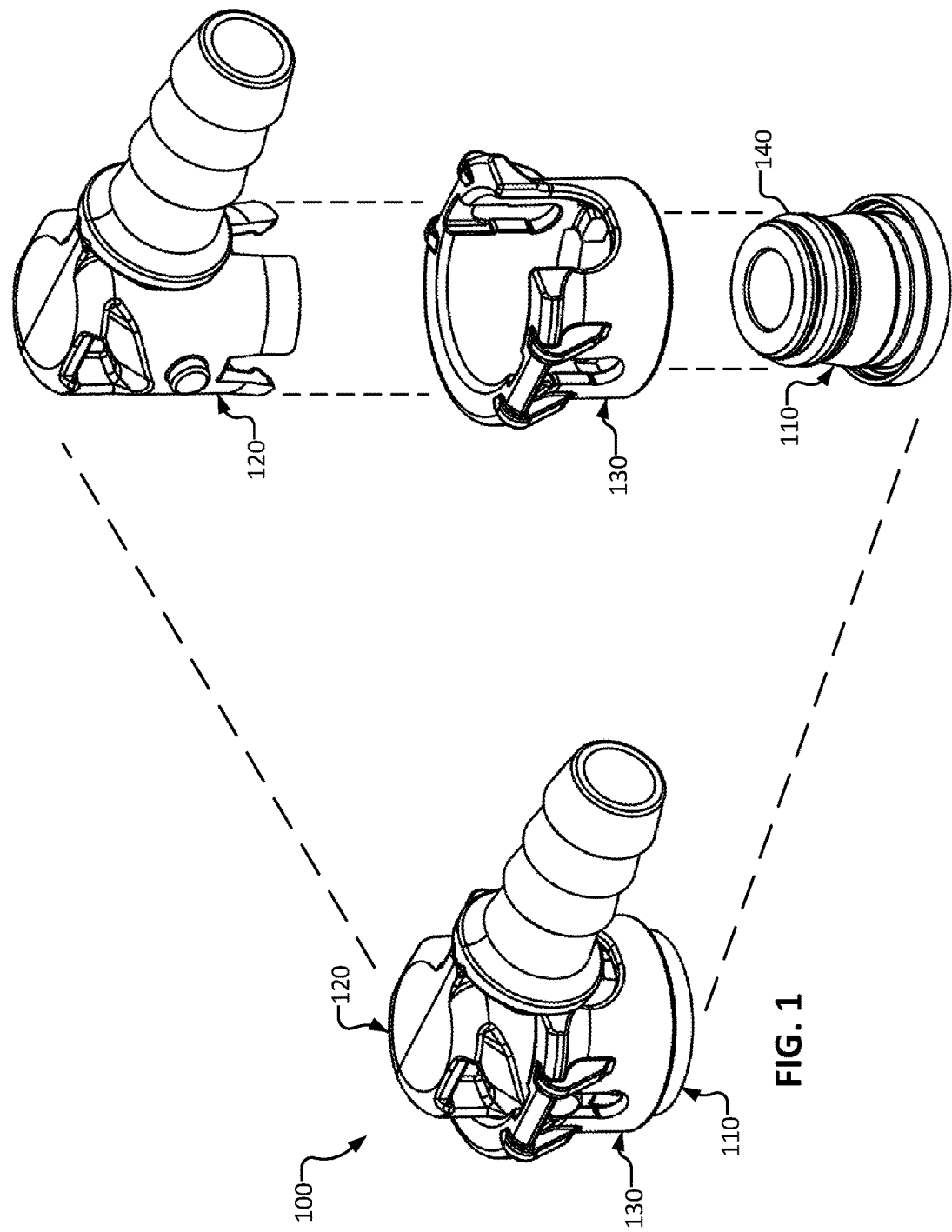

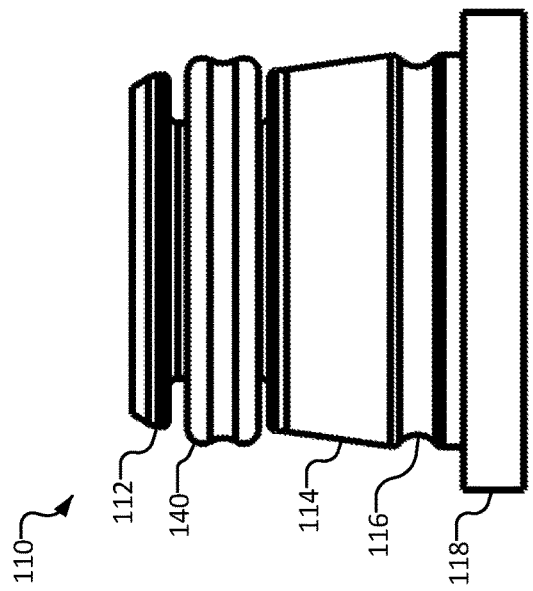
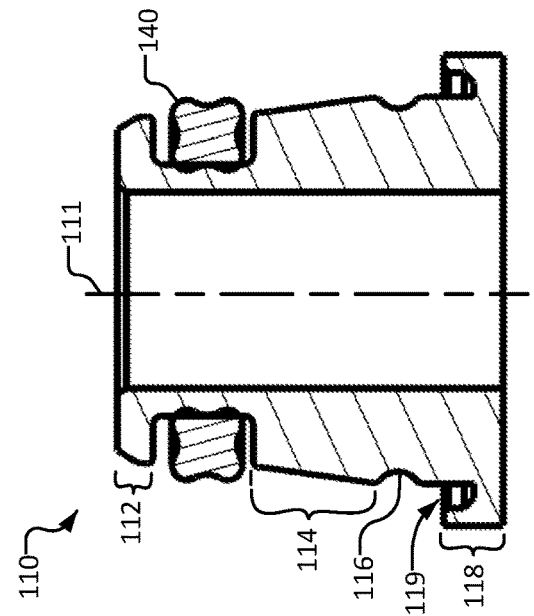
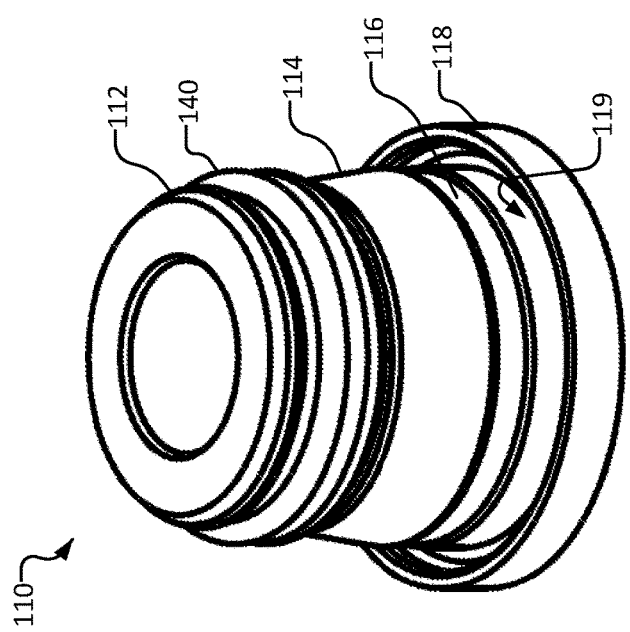

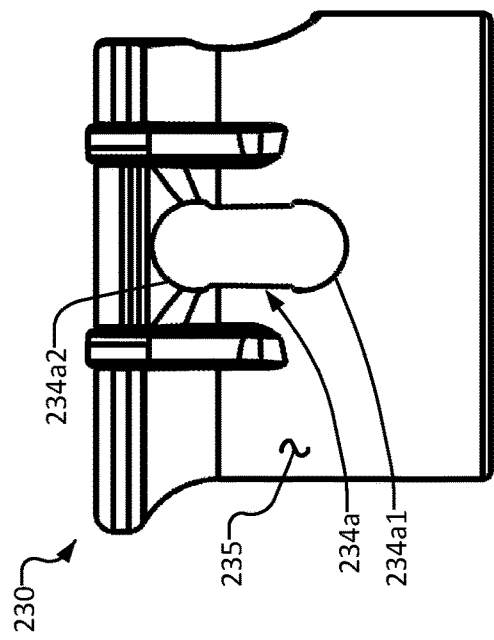
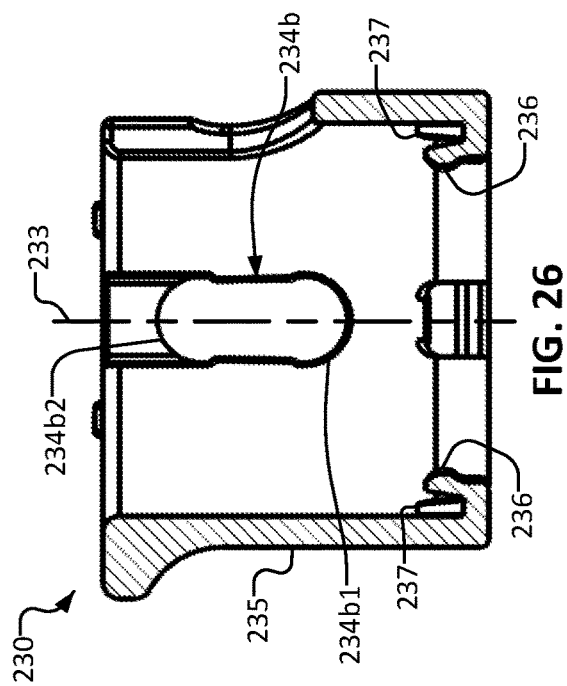
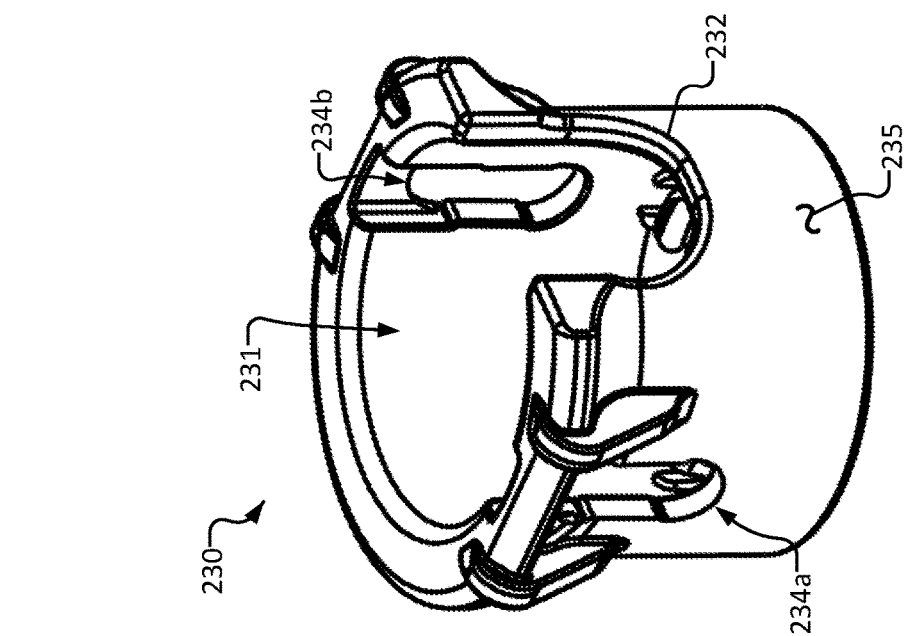

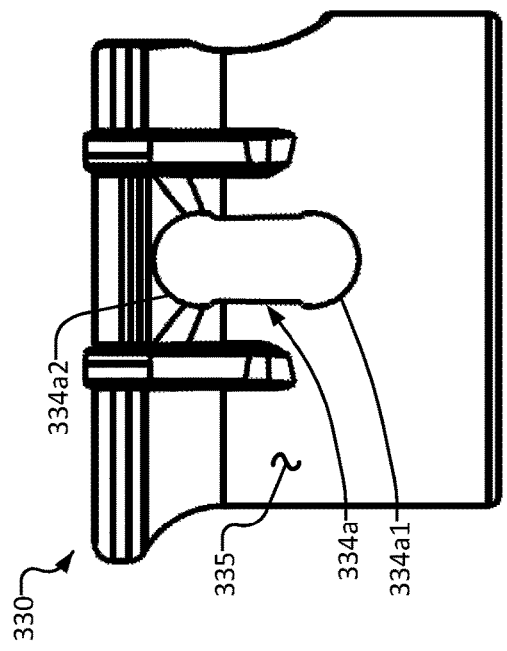
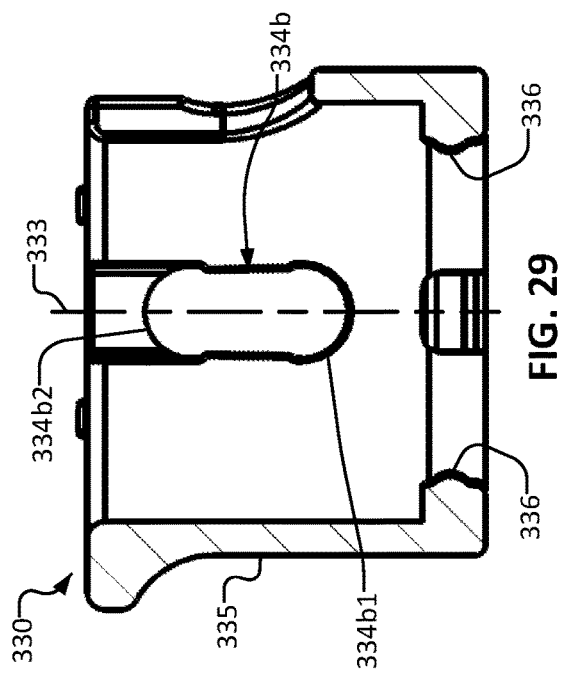
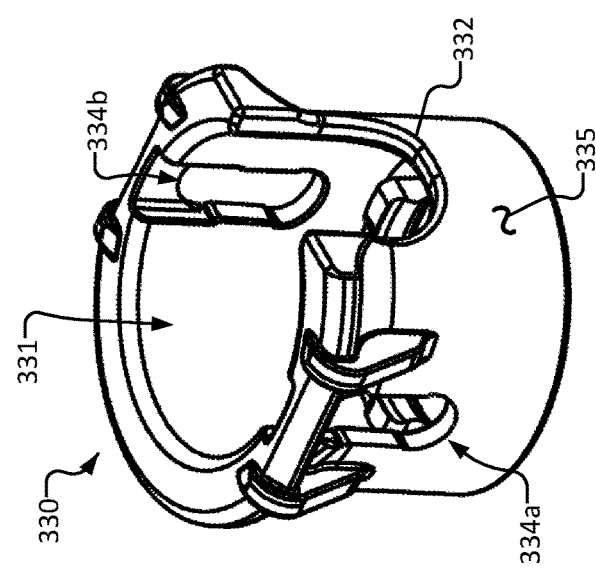

FLUID COUPLINGS

CROSS-REFERENCE TO RELATED APPLICATIONS

This application claims the benefit of U.S. Provisional Application Ser. No. 63/071,009, filed Aug. 27, 2020. The disclosure of the prior application is considered part of (and is incorporated by reference in) the disclosure of this application.

BACKGROUND

1. Technical Field

This document relates to fluid coupling devices for fluid handling systems. For example, some embodiments described in this document relate to fluid coupling devices that snap together, and are then releasably secured to each other using a collar and collet mechanism.

2. Background Information

Some fluid handling systems may require fluid couplings that can easily and securely connect a fluid flow path. For example, fluid coupling devices used in systems that provide fluid for liquid cooling of heat-generating devices such as computer hardware can benefit from compact fluid couplings that provide a secure but releasable connection.

SUMMARY

This document describes fluid coupling devices for fluid handling systems. For example, some embodiments described in this document relate to fluid coupling devices that snap together, and are then releasably secured to each other using a collar and collet mechanism. Some fluid coupling devices described herein are well suited for use in systems that provide fluid cooling for heat generating devices such as computer hardware. Moreover, the fluid coupling devices described herein are also suitable for many other fluid-coupling uses.

In one aspect, this disclosure is directed to fluid couplings that include a male coupling, a female coupling, and a collar. The male coupling has a first end portion and defines a longitudinal axis, a circumferential recess facing radially outward, and an annular groove facing longitudinally toward the first end portion. The female coupling defines an internal space configured to receive at least the first end portion of the male coupling. The female coupling includes an end portion comprising a collet structure with radially inward-extending projections. The collar defines a central open space. The collar is engaged with the female coupling and slidable thereon between: (i) an unlocked end of travel position in which the collet structure is longitudinally extending outside of the central open space of the collar and (ii) a locked end of travel position in which the collet structure is within the central open space of the collar. The collar includes longitudinally extending projections configured to engage in the annular groove of the male coupling when: (i) the male and female couplings are in a coupled configuration and (ii) the collar is in the locked end of travel position.

Such a fluid coupling may optionally include one or more of the following features. While the male and female couplings are in the coupled configuration, the radially inward-extending projections of the female coupling are seated in the circumferential recess of the male coupling. The female coupling may include a radial projection and the collar may define a lateral slot in which the radial projection is slidably disposed. In some embodiments, the radial projection is at a first end of the lateral slot when the collar is in the unlocked end of travel position. In some embodiments, the radial projection is at a second end of the lateral slot when the collar is in the locked end of travel position.

In another aspect, this disclosure is directed to another fluid coupling. The fluid coupling includes a female coupling and a collar. The female coupling defines an internal space configured to receive a portion of a male coupling. The female coupling includes an end portion comprising a collet structure with radially inward-extending projections. The collar defines a central open space. The collar is engaged with the female coupling and slidable thereon between: (i) an unlocked end of travel position in which the collet structure is longitudinally extending outside of the central open space of the collar and (ii) a locked end of travel position in which the collet structure is within the central open space of the collar. The collar includes longitudinally extending projections configured to extend longitudinally beyond the collet structure while the collar is in the locked end of travel position.

Such a fluid coupling may optionally include one or more of the following features. The female coupling may include a radial projection and the collar may define a lateral slot in which the radial projection is slidably disposed. In some embodiments, the radial projection is at a first end of the lateral slot when the collar is in the unlocked end of travel position. In some embodiments, the radial projection is at a second end of the lateral slot when the collar is in the locked end of travel position.

In another aspect, this disclosure is directed to another fluid coupling. The fluid coupling includes a male coupling, a female coupling, and a collar. The male coupling defines a longitudinal axis and a circumferential recess facing radially outward. The female coupling defines an internal space configured to receive a portion of the male coupling. The female coupling includes an end portion comprising a collet structure with radially inward-extending projections. The collar defines a central open space. The collar is engaged with the female coupling and slidable thereon between: (i) an unlocked end of travel position in which the collet structure is longitudinally extending outside of the central open space of the collar and (ii) a locked end of travel position in which the collet structure is within the central open space of the collar. The collar includes radially inward-extending projections. While the male coupling is coupled with the female coupling and the collar is in the locked end of travel position, the radially inward-extending projections of the female coupling and the radially inward-extending projections of the collar are releasably seated in the circumferential recess of the male coupling.

Such a fluid coupling may optionally include one or more of the following features. The radially inward-extending projections of the collar may be spring projections configured to be radially deflectable. The female coupling may include a radial projection and the collar may define a lateral slot in which the radial projection is slidably disposed. In some embodiments, the radial projection is at a first end of the lateral slot when the collar is in the unlocked end of travel position. In some embodiments, the radial projection is at a second end of the lateral slot when the collar is in the locked end of travel position.

In another aspect, this disclosure is directed to another fluid coupling. The fluid coupling includes a female coupling, and a collar. The female coupling defines an internal space configured to receive a portion of a male coupling. The female coupling includes an end portion including a collet structure with radially inward-extending projections. The collar defines a central open space. The collar is engaged with the female coupling and slidable thereon between: (i) an unlocked end of travel position in which the collet structure is longitudinally extending outside of the central open space of the collar and (ii) a locked end of travel position in which the collet structure is within the central open space of the collar. The collar includes radially inward-extending spring projections that are configured to be individually radially deflectable.

Such a fluid coupling may optionally include one or more of the following features. In some embodiments, the collar also includes stop members that contact the female coupling while the collar is in the unlocked end of travel position such that the spring projections of the collar are spaced apart from the female coupling. The female coupling may include a radial projection and the collar may define a lateral slot in which the radial projection is slidably disposed. In some embodiments, the radial projection is at a first end of the lateral slot when the collar is in the unlocked end of travel position. In some embodiments, the radial projection is at a second end of the lateral slot when the collar is in the locked end of travel position.

In another aspect, this disclosure is directed to a male fluid coupling. Such a male fluid coupling includes a first end portion, a mid-body portion, and a second end portion. The male fluid coupling defines: a longitudinal axis; a central open flow path extending from the first end portion to the second end portion along the longitudinal axis; a seal groove located between the first end portion and the mid-body portion; a circumferential recess facing radially outward; and an annular groove facing longitudinally toward the first end portion. The annular groove is located at the second end portion. The circumferential recess is located between the second end portion and the mid-body portion.

Such a male fluid coupling may optionally include one or more of the following features. The male fluid coupling may also include a seal disposed in the seal groove. In some embodiments, the mid-body portion has an outer diameter that is larger than an outer diameter of the seal. A diameter of the circumferential recess may be less than a diameter of the annular groove. At least a portion of the mid-body portion may be frustoconical shaped.

Particular embodiments of the subject matter described in this document can be implemented to realize one or more of the following advantages. First, in some embodiments, the male and female portions of the fluid coupling devices are designed to be easily coupleable to each other. For example, the coupling technique can be a simple two-step process that includes snapping-in-place and securing by sliding a collar. The technique for uncoupling can be the same two steps performed in the opposite order.

Second, in some embodiments, the male and female portions of the fluid coupling devices are designed to securely couple together. In some embodiments, the securement mechanism includes a collar and collet mechanism, which is designed for providing robust coupling. Accordingly, the potential for premature or inadvertent undesirable disconnection of the male and female portions of the fluid coupling is reduced.

Third, the fluid couplings described herein are designed for ease of manufacture. For example, in some embodiments the fluid couplings include only three component parts plus a seal. In some embodiments, the component parts are readily manufactured by injection molding or machining processes.

Fourth, the fluid couplings described herein are designed to provide audible "click" sounds when the male and female portions of the fluid coupling are snapped together and then clamped to each other in the coupled configuration. Accordingly, the user can be assured of proper coupling by the audible feedback provided by the couplings.

Fifth, the fluid couplings described herein are designed to provide tactile feedback when the male and female portions of the fluid coupling are snapped together and then secured to each other in the coupled configuration.

Unless otherwise defined, all technical and scientific terms used herein have the same meaning as commonly understood by one of ordinary skill in the art to which this disclosure pertains. In addition, the materials, methods, and examples of the embodiments described herein are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

FIG. 1 is a perspective view of an example fluid coupling in accordance with some embodiments described herein.

FIG. 2 is an exploded view of the fluid coupling of FIG. 1.

FIG. 3 is a perspective view of an example male coupling portion of the fluid coupling of FIG. 1.

FIG. 4 is a side view of the male coupling portion of FIG. 3.

FIG. 5 is a longitudinal cross-sectional view of the male coupling portion of FIG. 3.

FIG. 24 is a perspective view of an example collar of the fluid coupling of FIG. 19.

FIG. 25 is a side view of the collar of FIG. 24.

FIG. 26 is a longitudinal cross-sectional view of the collar of FIG. 24.

FIG. 27 is a perspective view of another example collar of the fluid coupling of FIG. 19.

FIG. 28 is a side view of the collar of FIG. 27.

FIG. 29 is a longitudinal cross-sectional view of the collar of FIG. 27.

Like reference numbers represent corresponding parts throughout.

DETAILED DESCRIPTION OF ILLUSTRATIVE EMBODIMENTS

Figure 7:
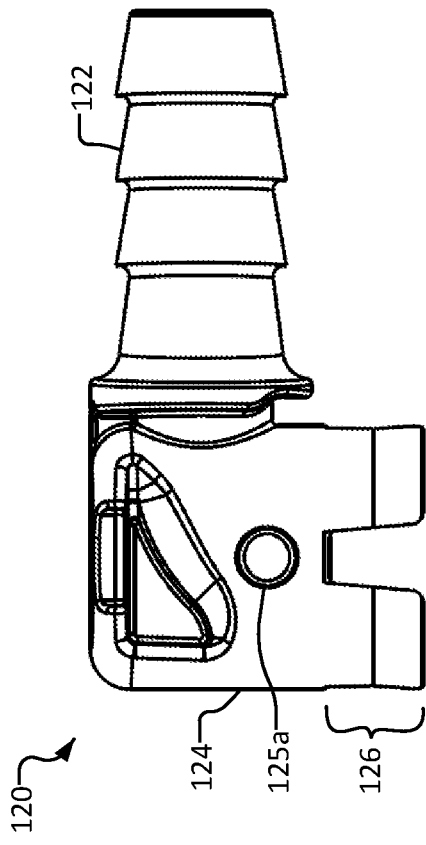
FIG. 7 is a side view of the female coupling portion of FIG. 6.

This document describes fluid coupling devices for fluid handling systems. For example, some embodiments described in this document relate to fluid coupling devices that snap together, and are then secured to each other using a collar and collet mechanism. Some fluid coupling devices described herein are well suited for use in systems that provide fluid cooling for heat generating devices such as computer hardware. The fluid coupling devices described herein are also suitable for many other uses.

Referring now to FIGS. 1-2, an example fluid coupling 100 can be used to convey fluid. As used herein, the term "fluid" means any substance that can be made to flow including, but is not limited to, liquids, gases, granular or powdered solids, mixtures or emulsions of two or more fluids, suspensions of solids within liquids or gases, etc.

The components of the fluid coupling 100 include a male coupling portion 110, a female coupling portion 120, a collar 130, and a seal member 140. For simplicity, the male coupling portion 110 will be referred to as the male coupling 110; the female coupling portion 120 will be referred to as the female coupling 120; and the seal member 140 will be referred to as the seal 140.

Figure 12:
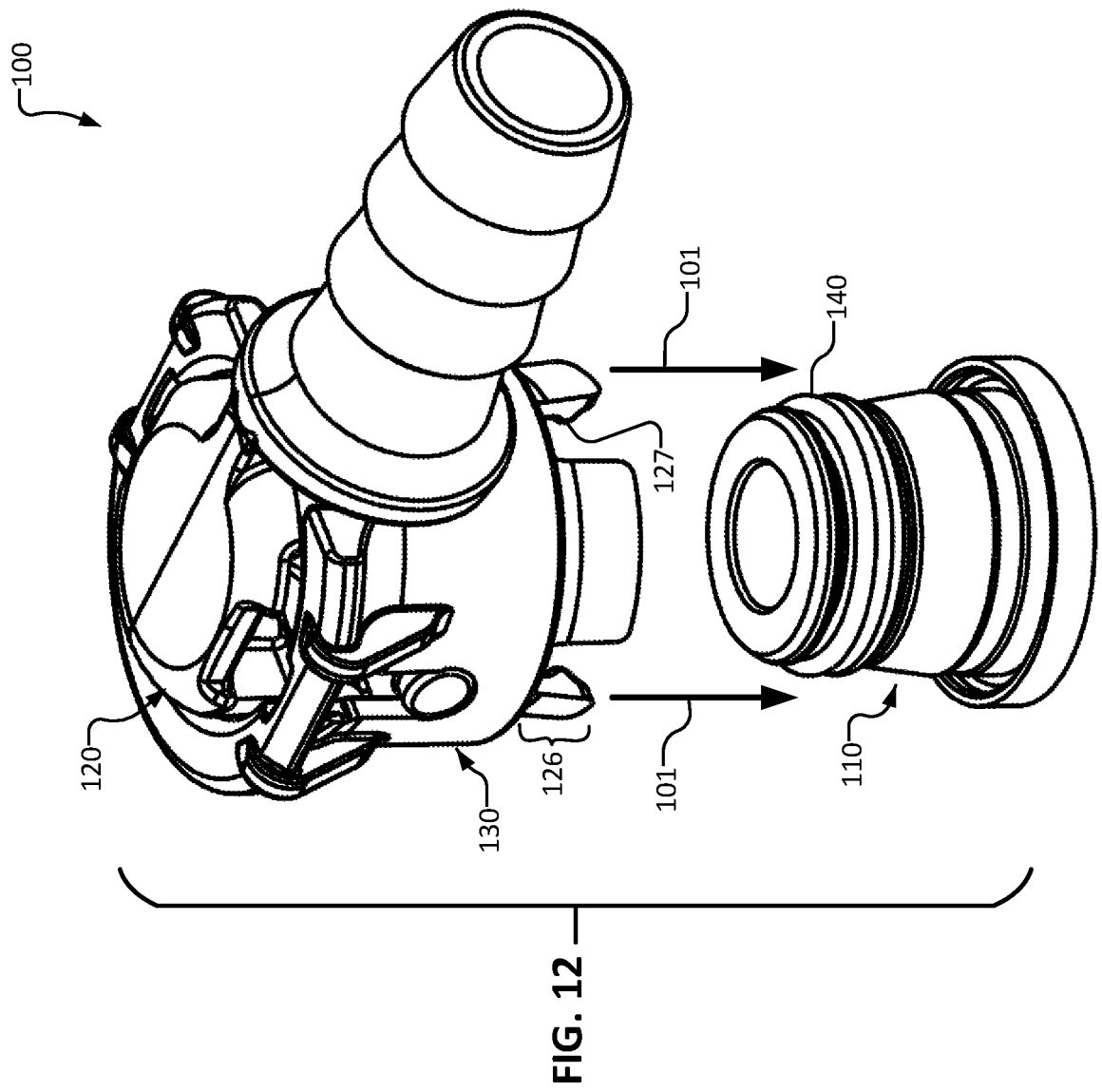
FIG. 12 is a perspective view of the fluid coupling of FIG. 1 in an uncoupled configuration.

The collar 130 is movably coupled to the female coupling 120 and normally resides on the female coupling 120 (e.g., as shown in FIG. 12). The combination of the female coupling 120 and collar 130 can be releasably coupled with the male coupling 110 to form a fluid-tight seal therebetween.

Figure 15:
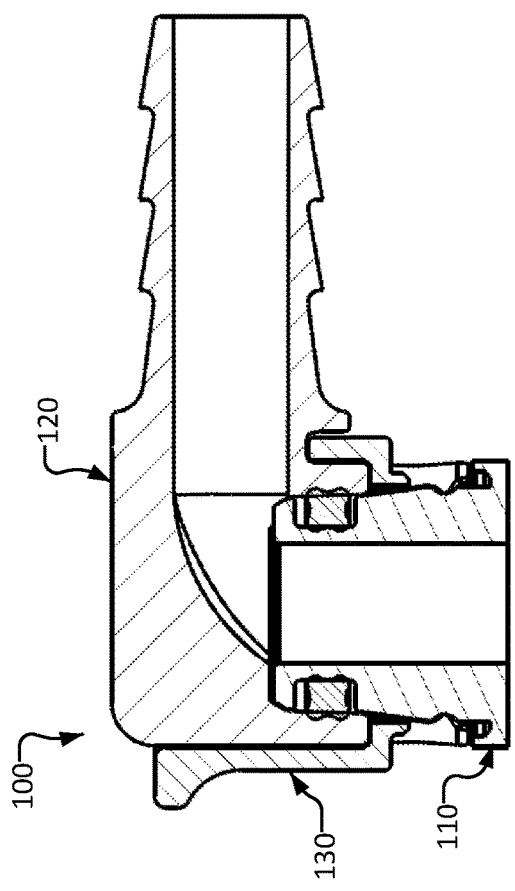
FIG. 15 is a longitudinal cross-sectional view of the arrangement of FIG. 13.
Figure 17:
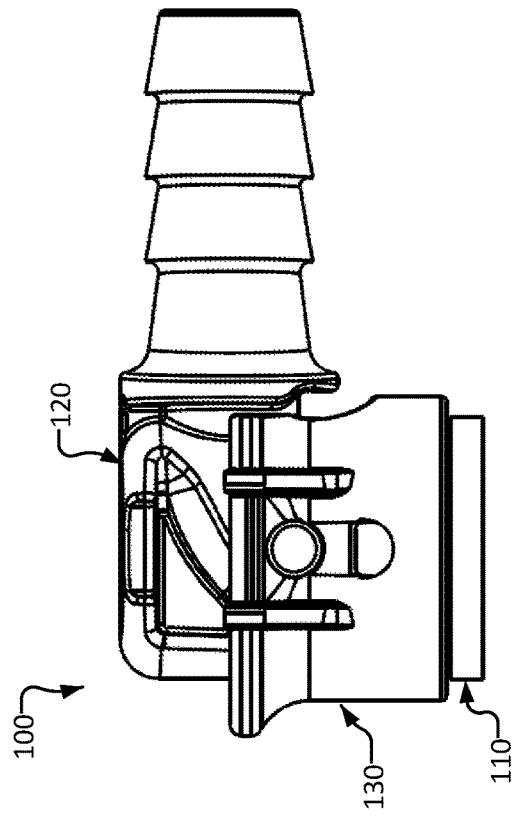
FIG. 17 is a side view of the arrangement of FIG. 16.
Figure 18:
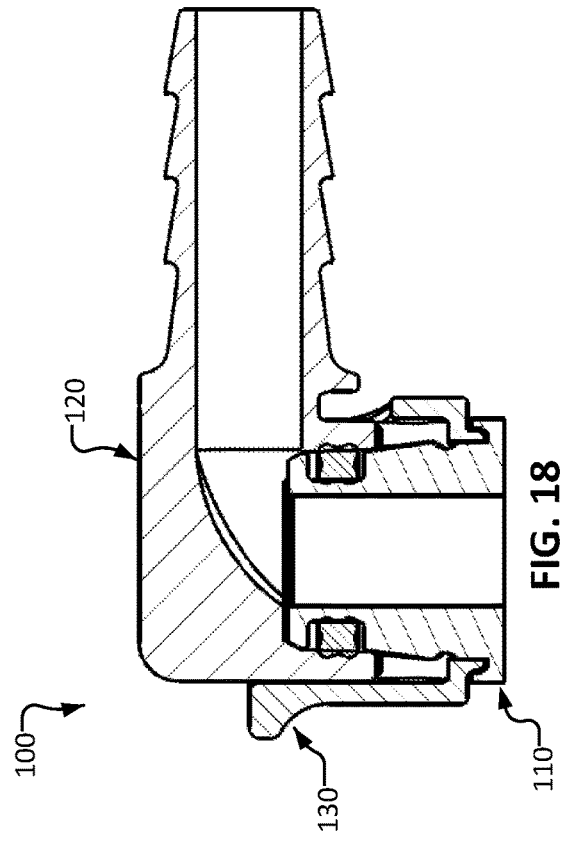
FIG. 18 is a longitudinal cross-sectional view of the arrangement of FIG. 16.
Figure 16:
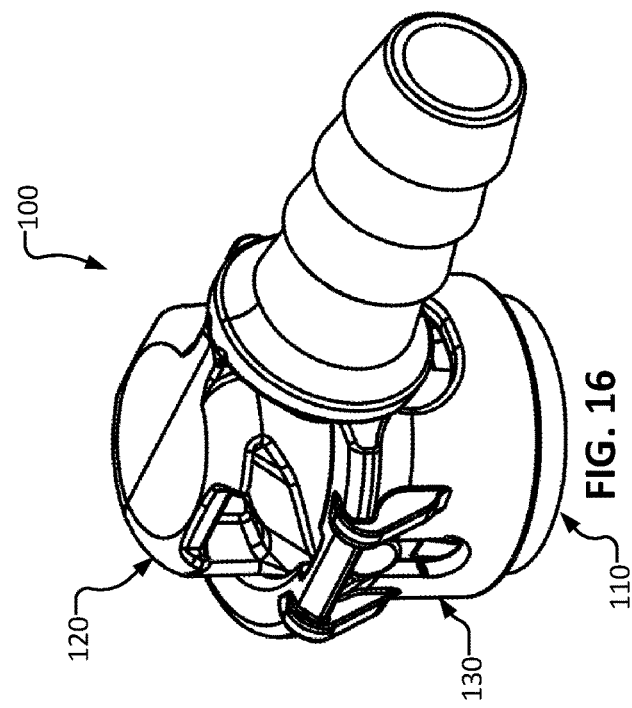
FIG. 16 is a perspective view of the fluid coupling of FIG. 1 in a coupled configuration.

As described further below, the fluid coupling 100 can be configured in an uncoupled arrangement (FIG. 12), a pre-coupled arrangement (FIGS. 13-15), and a coupled arrangement (FIGS. 16-18).

The materials from which one or more of the components of the fluid coupling 100 (and other fluid couplings described herein) can be made of include thermoplastics. In particular embodiments, the materials from which the components of the fluid coupling 100 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), acrylonitrile butadiene styrene (ABS), polyetherimide (PEI; e.g., Ultem), polypropylene, polyphenylene, polyaryletherketone, and the like, and combinations thereof.

In some embodiments, the materials from which one or more of the components of the fluid coupling 100 are made of include metals such as, but not limited to copper, stainless steel, brass, aluminum, plated steel, and the like. In particular embodiments, the fluid coupling 100 is metallic-free.

In some embodiments, while the female coupling 120 and the collar 130 are releasably coupled with the male coupling 110, the female coupling 120 and the collar 130 can be rotated in relation to the male coupling 110 (e.g., around the longitudinal axis of the male coupling 110). In some embodiments, the female coupling 120 and the collar 130 can be rotated in relation to the male coupling 110 while the fluid coupling 100 is in the pre-coupled arrangement (FIGS. 13-15), but not while the fluid coupling 100 is in the coupled arrangement (FIGS. 16-18). In particular embodiments, the female coupling 120 and the collar 130 can be rotated in relation to the male coupling 110 while the fluid coupling 100 is in the pre-coupled arrangement (FIGS. 13-15) and while the fluid coupling 100 is in the coupled arrangement (FIGS. 16-18).

Referring to FIGS. 3-5, the male coupling 110 is shown in isolation so its features are more readily visible. For example, the male coupling 110 includes a first end portion 112, a mid-body portion 114, an circumferential recess 116, and a second end portion 118. In the depicted embodiment, the cross-section shape of the male coupling 110 is generally circular. The majority of the male coupling 110 is configured to be releasably received within an internal space defined by the female coupling 120, as described further below.

The seal 140 is positioned in a circumferential seal groove defined by the male coupling 110. The seal groove is defined between the first end portion 112 and the mid-body portion 114. The circumferential recess 116 is between the mid-body portion 114 and the second end portion 118. The male coupling 110 defines a central bore extending between the first end portion 112 and the second end portion 118 along a longitudinal axis 111. The first end portion 112 includes a chamfer on its leading end.

In the depicted embodiment, the mid-body portion 114 is frustoconical in shape. In some embodiments, at least a portion of the mid-body portion 114 is cylindrical in shape. In some embodiments, the edge of the mid-body portion 114 that is immediately adjacent to the circumferential recess 116 is the largest diameter of the mid-body portion 114, and is larger in outer diameter than the outer diameter of the seal 140. In some embodiments, that largest outer diameter of the mid-body portion 114 is also the diameter of the cylindrical portion.

The male coupling 110 defines the circumferential recess 116. The circumferential recess 116 is configured to releasably receive projections of the female coupling 120 and/or the collar 130. In some embodiments, a cross-section of the circumferential recess 116 is shaped as a circular segment, a "V," a "U," a square, a rectangle, a semi-circle, and the like, and combinations thereof.

The male coupling 110 also includes the second end portion 118. In some embodiments, the second end portion 118 is affixed to a surface of a structure such as a plate, a manifold, a casing, a housing, a tube, and the like. In some such embodiments, the second end portion 118 is affixed to such a surface by welding, brazing, soldering, adhering, and the like, or by a releasable connection such as a threaded connection or a press-fit.

In the depicted embodiment, the second end portion 118 defines an annular groove 119. The circular opening to the annular groove 119, faces toward the first end portion 112 (rather than facing radially outward like the circumferential recess 116, for example). That is, the depth of the annular groove 119 extends longitudinally, (parallel to the longitudinal axis 111) from the opening of the annular groove 119 to the bottom of the annular groove 119. Accordingly, the annular groove 119 is defined by an inner wall and an outer wall. The outer wall is positioned radially outward from the inner wall.

In some embodiments, the seal 140 can be made of materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shape of the seal 140 can be circular, D-shaped, X-shaped, square, rectangular, U-shaped, multi-lobed, L-shaped, V-shaped, and the like, without limitation. In some embodiments, the outer diameter of the seal 140 is larger than the outer diameters of the portions of the male coupling 110 that are immediately adjacent to the seal 140. Accordingly, the seal 140 extends radially outward farther than the immediately adjacent portions of the male coupling 110.

Figure 8:
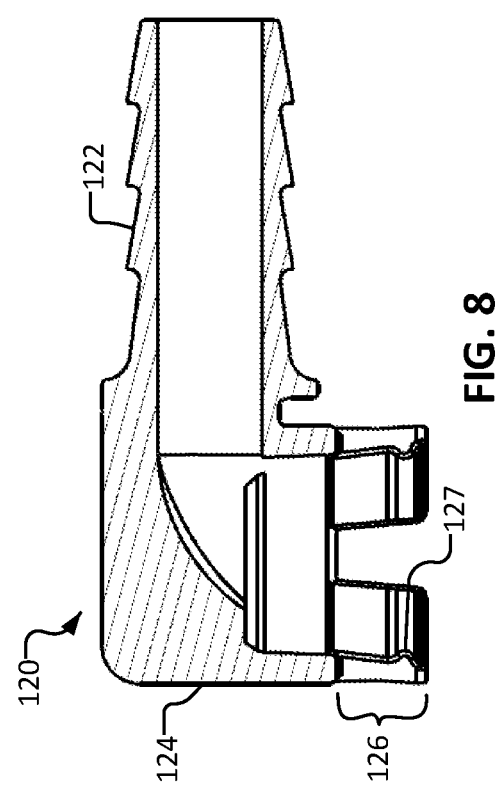
FIG. 8 is a longitudinal cross-sectional view of the female coupling portion of FIG. 6.
Figure 6:
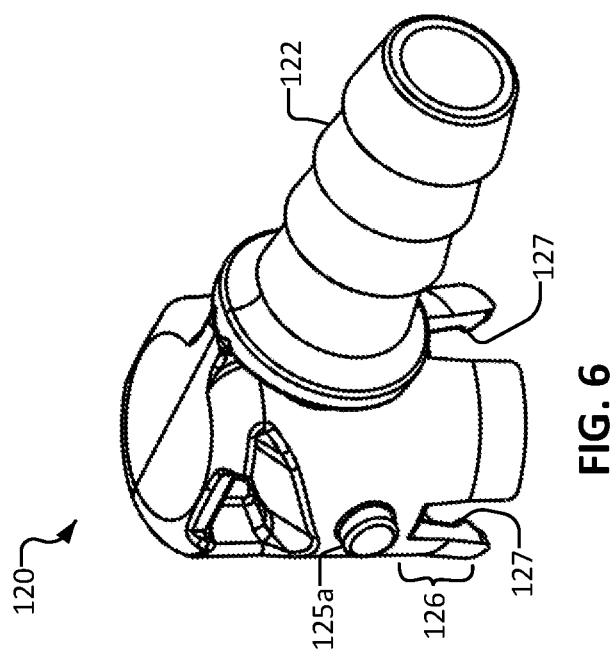
FIG. 6 is a perspective view of an example female coupling portion of the fluid coupling of FIG. 1.

Referring also to FIGS. 6-8, the female coupling 120 is shown in isolation so its features are more readily visible. For example, the female coupling 120 includes a termination end portion 122, a mid-body portion 124, and a collet end portion 126. The mid-body portion 124 is between the termination end portion 122 and the collet end portion 126. The collet end portion 126 and the mid-body portion 124 define an open internal space configured to receive portions of the male coupling 120 (e.g., at least the first end portion 112, the mid-body portion 114, and the circumferential recess 116). The female coupling 120 defines an open fluid flow path extending from the termination end portion 112 to the collet end portion 126.

In the depicted embodiment, the female coupling 120 is configured in a 90° elbow arrangement. In some embodiments, the female coupling 120 can be configured in other ways such as, but not limited to, as a 45° elbow, a straight fitting, a Tee fitting, a Y-fitting, and so on.

In the depicted embodiment, the termination end portion 122 is configured as a barbed connection. In some embodiments, the termination end portion 122 can be configured in other ways such as, but not limited to, a threaded connection (e.g., straight thread or pipe thread), a compression fitting, a quick disconnect, a sanitary fitting, hydraulic quick connection, luer fitting, a solder connection, and so on.

The mid-body portion 124 includes two radial projections 125a and 125b (not visible). In the depicted embodiment, the two radial projections 125a and 125b radially extend along a common axis (e.g., 180° apart from each other in opposite directions). In the depicted embodiment, the radial projections 125a and 125b are cylindrical. In some embodiments, the radial projections 125a and 125b may have other shapes. The mid-body portion 124 can also include one or more external structural features that a tool can releasably connect with for assisting with the coupling and/or uncoupling process between the female coupling 120 and the male coupling 110.

The female coupling 120 also includes the collet end portion 126. The collet end portion 126 comprises a collet structure with two or more jaw portions (like a mechanical collet). In the depicted embodiment, the collet end portion 126 includes four jaw portions. The jaw portions can include an inward-extending radial projection 127 (extending orthogonally from the arm of the jaw portion). In the depicted embodiment, the radial projections 127 are arcuate and radially extending. The radial projections 127 are configured to seat in the circumferential recess 116 of the male coupling 110.

The jaw portions of the collet end portion 126 are radially flexible. Accordingly, as the male coupling 110 and female coupling 120 are coupled with each other, the jaw portions of the collet end portion 126 will flex radially outward, and then the radial projections 127 will snap into the circumferential recess 116.

Figure 10:
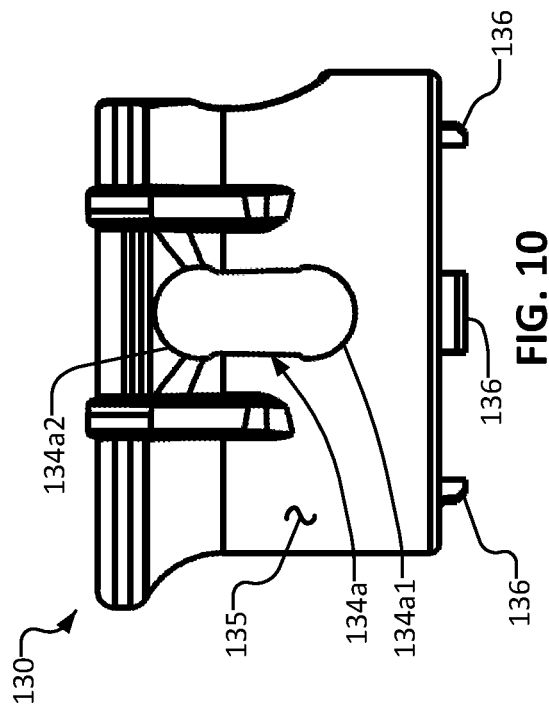
FIG. 10 is a side view of the collar of FIG. 9.
Figure 11:
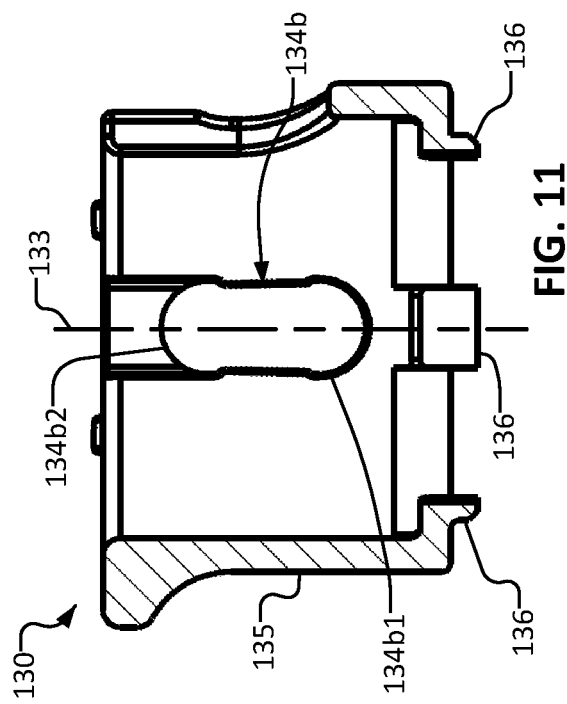
FIG. 11 is a longitudinal cross-sectional view of the collar of FIG. 9.
Figure 9:
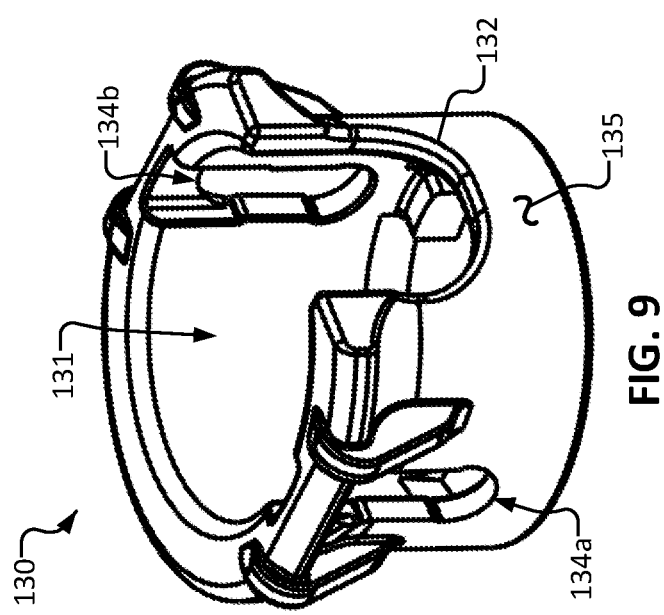
FIG. 9 is a perspective view of an example collar of the fluid coupling of FIG. 1.

Referring also to FIGS. 9-11, the collar 130 is shown in isolation so its features are more readily visible. For example, the collar 130 includes a main body 135 that defines a central open space 131, extending from open end to opposite open end of the collar 130 along the central longitudinal axis 133. The female coupling 120 is disposable within the central open space 131 such that the collar 130 is slidable relative to the female coupling 120 along the longitudinal axis 133. The main body 135 of the collar 130 also defines a transverse slot 132 through which a portion of the termination end portion 122 of the female coupling 120 can movably extend. The main body 135 can also include one or more external structural features that a tool can releasably connect with for assisting with the coupling and/or uncoupling process between the female coupling 120 and the male coupling 110.

The main body 135 of the collar 130 also defines two lateral slots 134a and 134b, through opposite sidewalls of the collar 130. That is, the two lateral slots 134a-b are oriented 180° opposed to each other in this example. When the collar 130 is slidably engaged on the female coupling 120, the radial projections 125a-b of the female coupling 120 extend through the lateral slots 134a-b. For example, the radial projection 125a extends through the lateral slot 134a, and the radial projection 125b extends through the lateral slot 134b. Because the lateral slots 134a-b are elongate, the radial projections 125a-b can be positioned at multiple positions within the lateral slots 134a-b.

The lateral slots 134a-b have opposing ends that are enlarged in comparison to the middle portions of the lateral slots 134a-b. That is, the lateral slot 134a has a first enlarged end 134a1 and a second enlarged end 134a2. Similarly, the lateral slot 134b has a first enlarged end 134b1 and a second enlarged end 134b2. Accordingly, it can be said that the lateral slots 134a-b are "dog bone shaped" or "barbell shaped." The middle portions of the lateral slots 134a-b are slightly narrower than the outer diameters of the radial projections 125a-b. The enlarged ends of the lateral slots 134a-b are equal to or slightly larger than the outer diameters of the radial projections 125a-b. Accordingly, the collar 130 will tend to become releasably detained or latched relative to the female coupling 120 while the radial projections 125a-b are located within either of the enlarged ends of the lateral slots 134a-b. In other words, the radial projections 125*a-b* in combination with the lateral slots 134*a-b* provide a latch mechanism that will cause the collar 130 to be detained or latched at either of its end of travel positions relative to the female coupling 120. As described further below, in one of those end of travel positions the fluid coupling 100 is in its coupled configuration (e.g., FIGS. 16-19).

The collar 130 includes multiple projections 136. In the depicted embodiment, the projections 136 extend from the main body 135 along paths that are substantially parallel to the longitudinal axis 133 (e.g., within about +/−10° of parallel). There are four of the projections 136 in the depicted example embodiment of the collar 130. In some embodiments, the collar 130 includes one, two, three, four, five, six, seven, eight, or more than eight of the projections 136.

In the depicted embodiment, the leading ends (or free ends) of the projections 136 are beveled, and a portion of the projections 136 have an inner and outer wall surface that are parallel to each other (and substantially parallel to the longitudinal axis 133. In some embodiments, the projections 136 have other types of cross-sectional shapes such as triangular, rectangular, trapezoidal, and the like, and combinations thereof.

Referring also to FIG. 12, as described above, the fluid coupling 100 includes the male coupling 110, the female coupling 120, the collar 130, and the seal 140. The collar 130 is engaged, as depicted, on the female coupling 120, and is longitudinally slidably relative to the female coupling 120. The radial projections 125*a-b* of the female coupling 120 are disposed within the lateral slots 134*a-b* of the collar 130. The fluid coupling 100 is shown in the uncoupled configuration.

In the depicted uncoupled configuration of the fluid coupling 100, the collar 130 is positioned in an unlocked end of travel position relative to the female coupling 120. In this unlocked orientation, the radial projections 125*a-b* of the female coupling 120 are positioned in the first enlarged ends 134*a*1 and 134*b*1 of the lateral slots 134*a-b* of the collar 130.

While the collar 130 is in the unlocked end of travel position as depicted, the collet end portion 126 of the female coupling 120 is longitudinally extending outside of the central open space 131 of the collar 130. Accordingly, the collet end portion 126 is not radially constrained by the collar 130, and the collet end portion 126 can radially splay open.

With the collet end portion 126 radially splayed open as shown, the female coupling 120 can be engaged onto the male coupling 110 as indicated by the arrows 101. In some embodiments, the collet end portion 126 radially splays open to the extent that all of the radial projections 127 of the collet end portion 126 dimensionally can clear the outer diameter of the seal 140 as the female coupling 120 is engaged onto the male coupling 110. That is, in some embodiments the collet end portion 126 radially splays open to the extent that the male coupling 110 and female coupling 120 can be engaged to each other without the radial projections 127 of the collet end portion 126 touching the seal 140.

Figure 14:
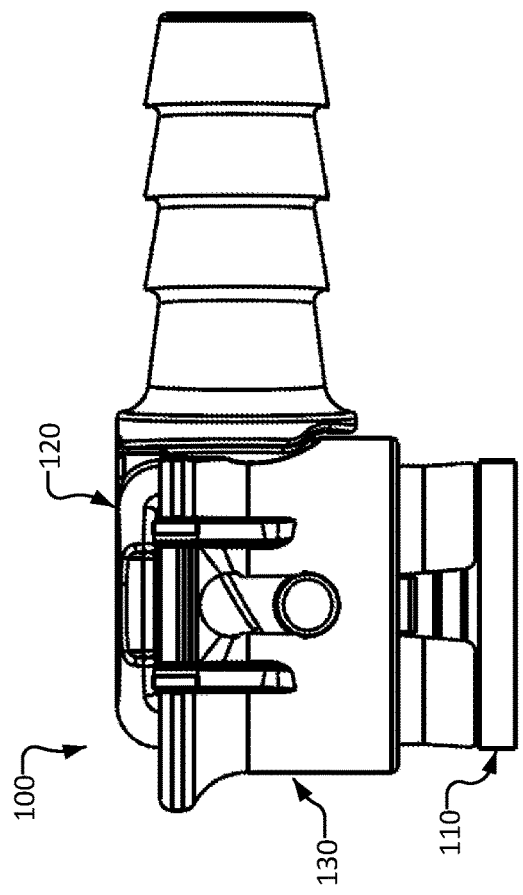
FIG. 14 is a side view of the arrangement of FIG. 13.
Figure 13:
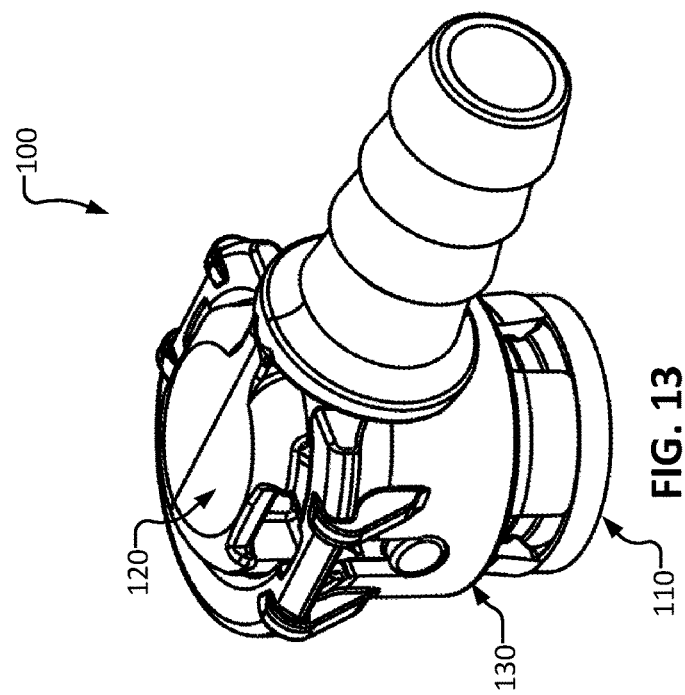
FIG. 13 is a perspective view of the fluid coupling of FIG. 1 in a pre-coupled configuration.

Referring also to FIGS. 13-15, here the fluid coupling 100 is shown in its pre-coupled configuration. In the pre-coupled configuration, the male coupling 110 and female coupling 120 are engaged with each other, while the collar 130 is still positioned in its unlocked end of travel position relative to the female coupling 120. The fluid flow path through the fluid coupling 100 is sealed in this pre-coupled configuration.

In the pre-coupled configuration, the inwardly extending radial projections 127 of the collet end portion 126 of the female coupling 120 are seated in the circumferential recess 116 of the male coupling 110. In some embodiments, the radial projections 127 of the collet end portion 126 mechanically snap into the circumferential recess 116 of the male coupling 110, and an audible snap noise is created that provides a user with audible and/or tactile feedback indicating that the pre-coupled configuration has been properly made.

In some embodiments, the female coupling 120 is rotatable in relation to the male coupling 110 while the fluid coupling 100 is in the pre-coupled configuration. That is, in some embodiments the female coupling 120 can be rotated 360° about the longitudinal axis 111 of the male coupling 110 while the fluid coupling 100 remains in the pre-coupled configuration. In some embodiments, it is not possible for such rotation to take place, or only a limited degree of rotation can take place.

Referring also to FIGS. 16-18, here the fluid coupling 100 is shown in its coupled configuration in which the fluid coupling 100 is operative and fully ready for use. In the coupled configuration, the male coupling 110 and female coupling 120 are engaged with each other, while the collar 130 is positioned in its locked end of travel position relative to the female coupling 120.

In the locked orientation, the radial projections 125*a-b* of the female coupling 120 are positioned in the second enlarged end portions 134*a*2 and 134*b*2 of the lateral slots 134*a-b* of the collar 130.

While the collar 130 is positioned in its locked end of travel position as shown, the collet structure 126 is within the central open space 131 of the collar 130 and the main body 135 of the collar 130 circumferentially encompasses the collet end portion 126 of the female coupling 120. Accordingly, the main body 135 of the collar 130 provides radial reinforcement to keep the inwardly extending radial projections 127 of the collet end portion 126 of the female coupling 120 seated in the circumferential recess 116 of the male coupling 110.

In addition, while the collar 130 is positioned in its locked end of travel position as shown, the projections 136 of the collar 130 extend longitudinally beyond the collet end portion 126, and the projections 136 are releasably engaged within the annular groove 119 of the male coupling 110. This provides additional strength to the collar 130 as it reinforces the radial projections 127 to remain seated in the circumferential recess 116.

In some embodiments, the female coupling 120 is rotatable in relation to the male coupling 110 while the fluid coupling 100 is in the coupled configuration. That is, in some embodiments the female coupling 120 can be rotated 360° about the longitudinal axis 111 of the male coupling 110 while the fluid coupling 100 remains in the coupled configuration. In some embodiments, it is not possible for such rotation to take place, or only a limited degree of rotation can take place.

Figure 20:
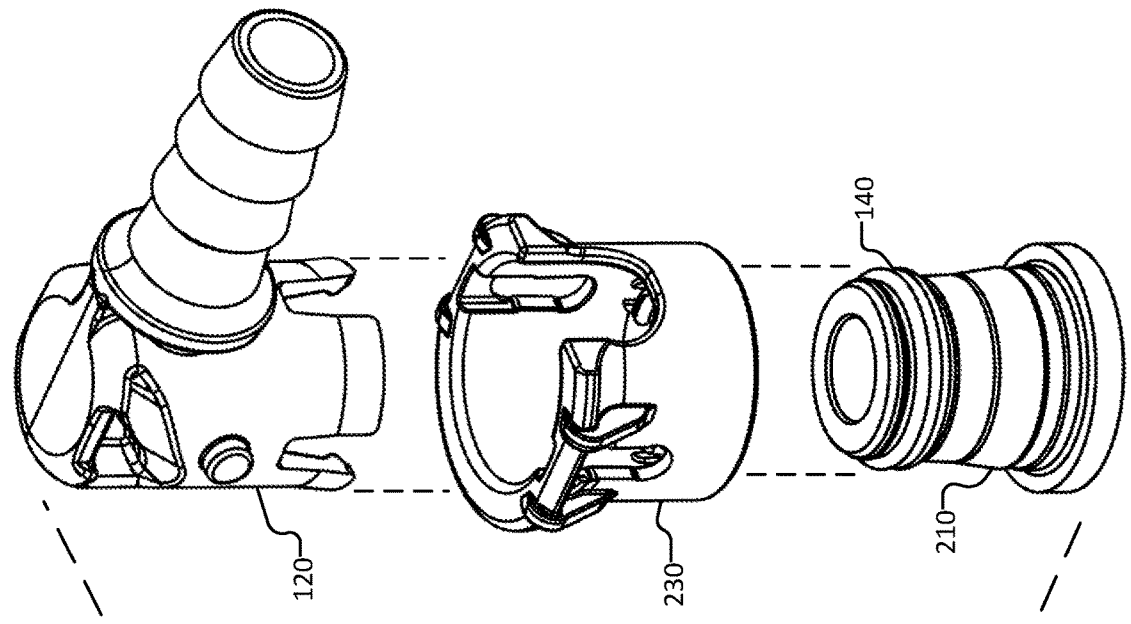
FIG. 20 is an exploded view of the fluid coupling of FIG. 19.
Figure 19:
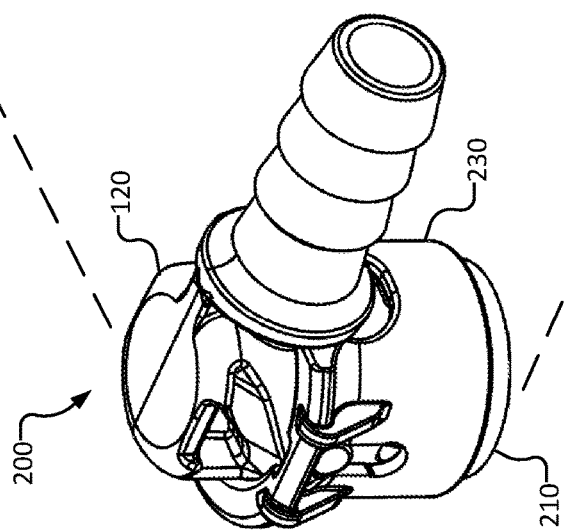
FIG. 19 is a perspective view of another example fluid coupling in accordance with some embodiments described herein.

Referring to FIGS. 19 and 20, another example fluid coupling 200 can be used to convey fluid. The components of the fluid coupling 200 include a male coupling portion 210, the female coupling 120 (same as above), a collar 230, and the seal 140 (same as above). For simplicity, the male coupling portion 210 will be referred to as the male coupling 210.

Figure 35:
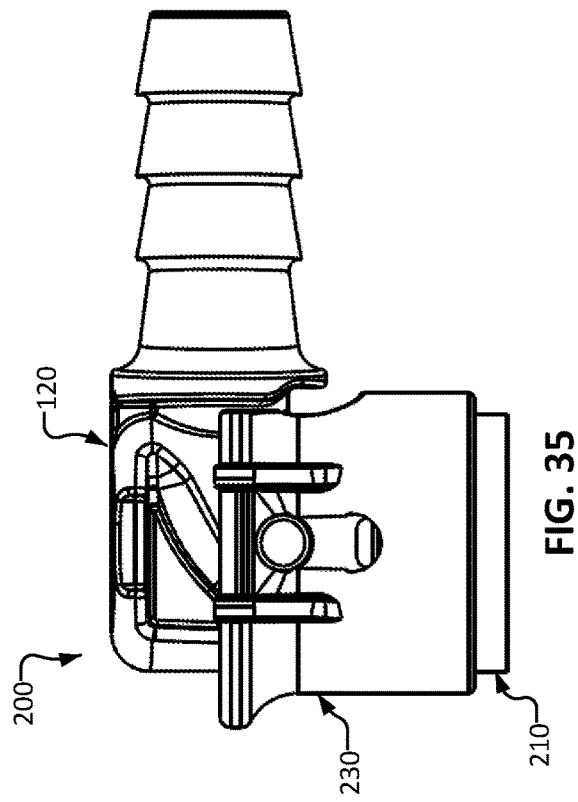
FIG. 35 is a side view of the arrangement of FIG. 34.
Figure 36:
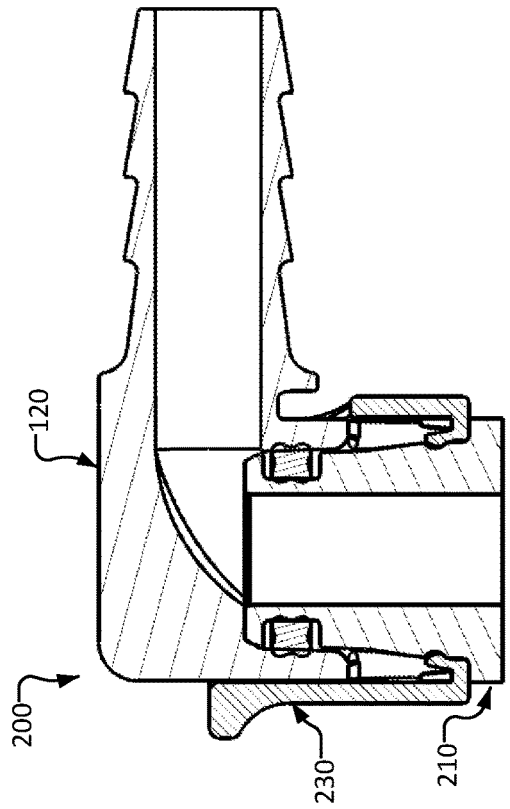
FIG. 36 is a longitudinal cross-sectional view of the arrangement of FIG. 34.

The fluid coupling 200 operationally functions in many of the same ways as the fluid coupling 100. For example, the fluid coupling 200 has an uncoupled configuration (FIG. 30), a pre-coupled configuration (FIGS. 31-33), and a coupled configuration (FIGS. 34-36). Also, the collar 230 is slidably coupled with the female coupling 120 and can be shifted between an unlocked position (FIGS. 30-33), and a locked position (FIGS. 34-36). Any of the features and variations of the fluid coupling 100 can be included in the fluid coupling 200.

Figure 22:
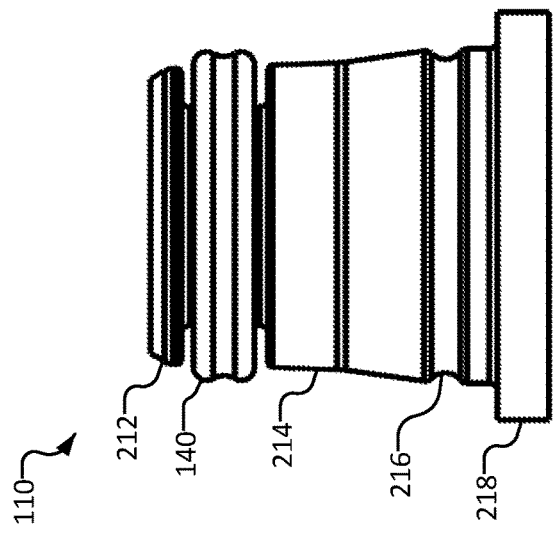
FIG. 22 is a side view of the male coupling portion of FIG. 21.
Figure 23:
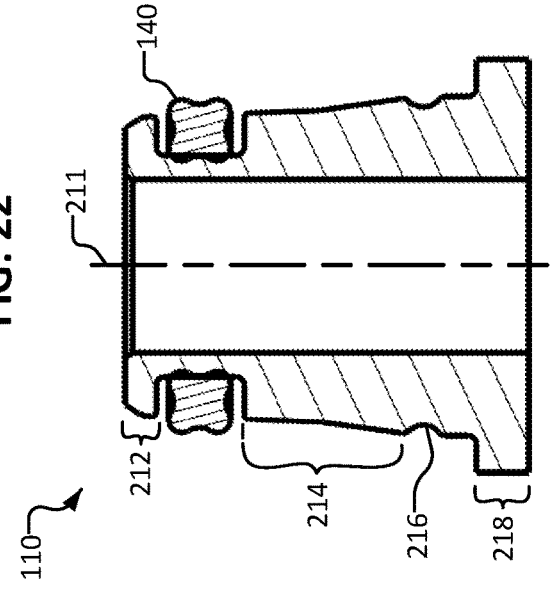
FIG. 23 is a longitudinal cross-sectional view of the male coupling portion of FIG. 21.
Figure 21:
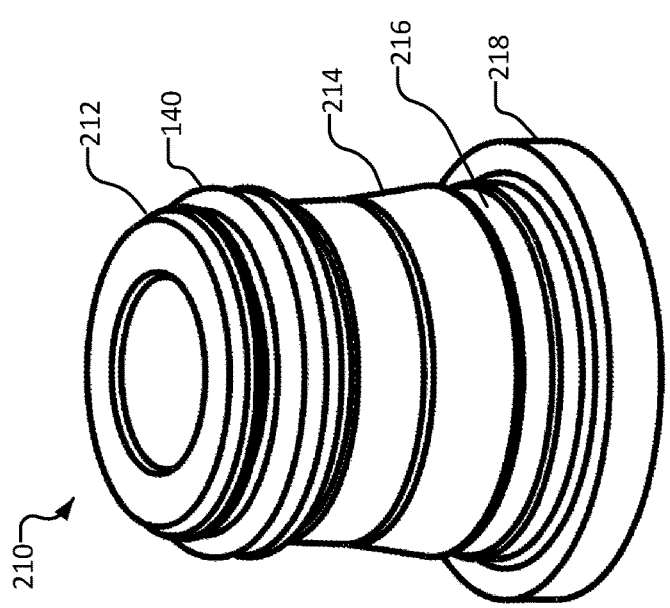
FIG. 21 is a perspective view of an example male coupling portion of the fluid coupling of FIG. 19.

Referring also to FIGS. 21-23, the male coupling 210 includes a first end portion 212, a mid-body portion 214, an circumferential recess 216, and a second end portion 218. In the depicted embodiment, the cross-section shape of the male coupling 210 is generally circular. The majority of the male coupling 210 is configured to be releasably received within an internal space defined by the female coupling 120, as described further below.

The male coupling 210 includes the features of the male coupling 110 as described above, except for the following differences. The male coupling 210 does not include the annular groove 119 of the male coupling 110. Also, the mid-body portion 214 includes a cylindrical portion and a frustoconical portion, whereas the mid-body portion 114 of the male coupling 110 is depicted as only having a frustoconical shape.

Referring also to FIGS. 24-26, the collar 230 includes a main body 235 that defines a central open space 231, extending from open end to opposite open end of the collar 230 along the central longitudinal axis 233. The female coupling 120 is disposable within the central open space 231 such that the collar 230 slidable relative to the female coupling 120 along the longitudinal axis 233. The main body 235 of the collar 230 also defines a transverse slot 232 through which a portion of the termination end portion 122 of the female coupling 120 can movably extend. The main body 235 can also include one or more external structural features that a tool can releasably connect with for assisting with the coupling and/or uncoupling process between the female coupling 120 and the male coupling 210.

The main body 235 of the collar 230 also defines two lateral slots 234a and 234b, through opposite sidewalls of the collar 230. The two lateral slots 234a-b are configured the same as the lateral slots 134a-b of the collar 130.

The collar 230 includes multiple spring projections 236 that extend radially inward. As described further below, the spring projections 236 are configured to be individually radially deflectable so that the spring projections 236 can releasably engage in the circumferential recess 216 of the male coupling 210.

The collar 230 also includes stop members 237. As shown in FIG. 33, the stop members 237 abut against the female coupling 120 when the collar 230 is in the unlocked position. Accordingly, the stop members 237 prevent direct contact between the spring projections 236 and the female coupling 120 (which could tend to damage the spring projections 236). That is, while the collar 230 is in the unlocked position, the spring projections 236 are spaced apart from the female coupling 120 due to the presence of the stop members 237.

FIGS. 27-29 show an alternate collar 330 that can be used with the male coupling 210. The collar 330 is configured the same as the collar 230 except that the collar 330 includes multiple projections 336 that extend radially inward (instead of the spring projections 236 and stop members 237 of the collar 230). The projections 336 are radiused, but are not spring members.

Figure 30:
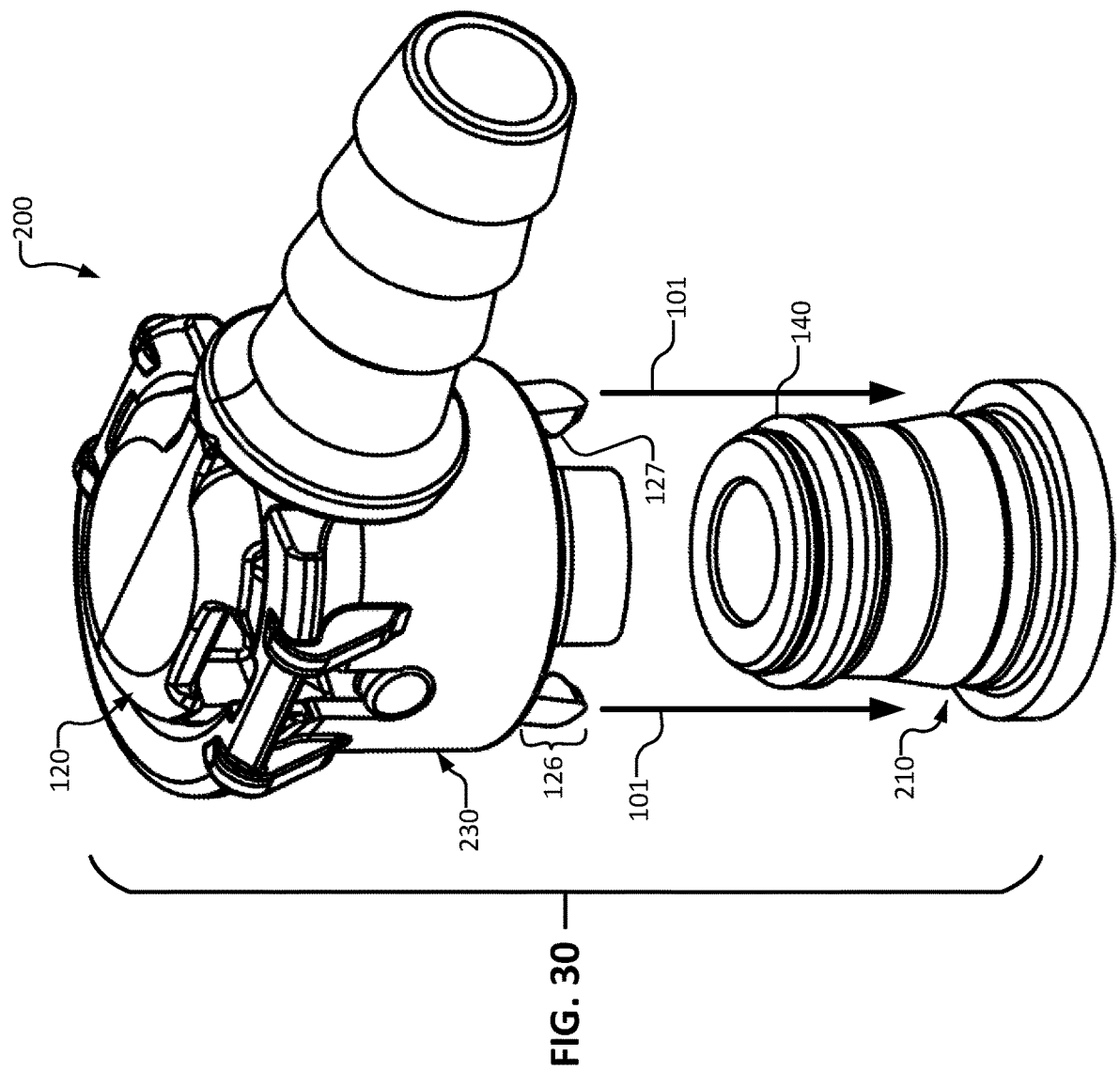
FIG. 30 is a perspective view of the fluid coupling of FIG. 19 in an uncoupled configuration.

Referring also to FIG. 30, as described above, the fluid coupling 200 includes the male coupling 210, the female coupling 120, the collar 230, and the seal 140. The collar 230 is engaged, as depicted, on the female coupling 120, and is longitudinally slidably relative to the female coupling 120. The radial projections 125a-b of the female coupling 120 are disposed within the lateral slots 234a-b of the collar 230. The fluid coupling 200 is shown in the uncoupled configuration.

In the depicted uncoupled configuration of the fluid coupling 200, the collar 230 is positioned in an unlocked end of travel position relative to the female coupling 120. In this unlocked orientation, the radial projections 125a-b of the female coupling 120 are positioned in the first enlarged ends 234a1 and 234b1 of the lateral slots 234a-b of the collar 230.

While the collar 130 is in the unlocked end of travel position as depicted, the collet end portion 126 of the female coupling 120 is longitudinally extending outside of the central open space 231 of the collar 230. Accordingly, the collet end portion 126 is not radially constrained by the collar 230, and the collet end portion 126 can radially splay open.

With the collet end portion 126 radially splayed open as shown, the female coupling 120 can be engaged onto the male coupling 210 as indicated by the arrows 101. In some embodiments, the collet end portion 126 radially splays open to the extent that all of the radial projections 127 of the collet end portion 126 dimensionally can clear the outer diameter of the seal 140 as the female coupling 120 is engaged onto the male coupling 210. That is, in some embodiments the collet end portion 126 radially splays open to the extent that the male coupling 210 and female coupling 120 can be engaged to each other without the radial projections 127 of the collet end portion 126 touching the seal 140.

Figure 32:
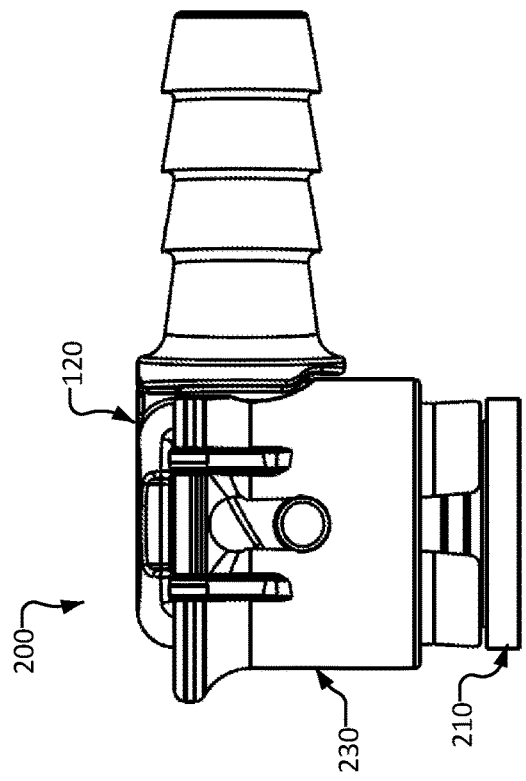
FIG. 32 is a side view of the arrangement of FIG. 31.
Figure 33:
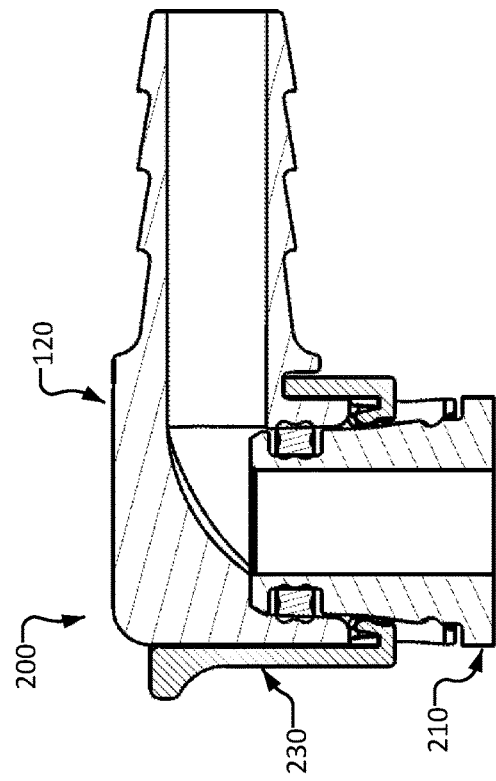
FIG. 33 is a longitudinal cross-sectional view of the arrangement of FIG. 31.
Figure 31:
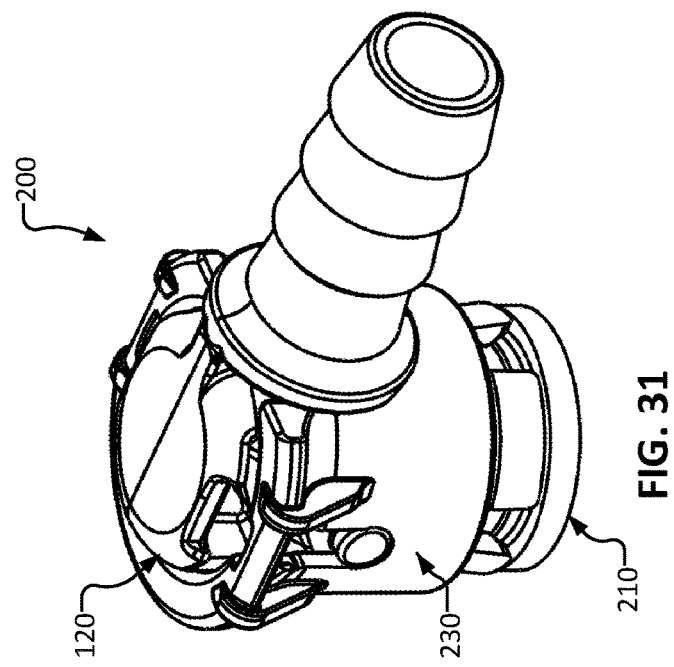
FIG. 31 is a perspective view of the fluid coupling of FIG. 19 in a pre-coupled configuration.
Figure 34:
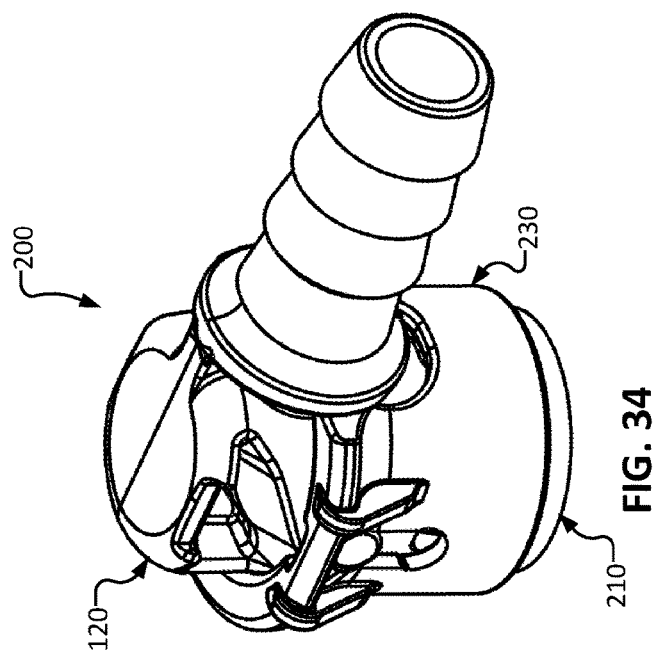
FIG. 34 is a perspective view of the fluid coupling of FIG. 19 in a coupled configuration.

Referring also to FIGS. 31-33, here the fluid coupling 200 is shown in its pre-coupled configuration. In the pre-coupled configuration, the male coupling 210 and female coupling 120 are engaged with each other, while the collar 230 is still positioned in its unlocked end of travel position relative to the female coupling 120.

In the pre-coupled configuration, the inwardly extending radial projections 127 of the collet end portion 126 of the female coupling 120 are seated in the circumferential recess 216 of the male coupling 210. In some embodiments, the radial projections 127 of the collet end portion 126 mechanically snap into the circumferential recess 216 of the male coupling 210, and an audible snap noise and/or tactile feedback is created that provides a user with feedback indicating that the pre-coupled configuration has been properly made.

In some embodiments, the female coupling 120 is rotatable in relation to the male coupling 210 while the fluid coupling 200 is in the pre-coupled configuration. That is, in some embodiments the female coupling 120 can be rotated 360° about the longitudinal axis 211 of the male coupling 210 while the fluid coupling 200 remains in the pre-coupled configuration. In some embodiments, it is not possible for such rotation to take place, or only a limited degree of rotation can take place.

Referring also to FIGS. 34-36, here the fluid coupling 200 is shown in its coupled configuration in which the fluid coupling 200 is operative and fully ready for use. In the coupled configuration, the male coupling 210 and female coupling 120 are engaged with each other, while the collar 230 is positioned in its locked end of travel position relative to the female coupling 120.

In the locked orientation, the radial projections 125a-b of the female coupling 120 are positioned in the second enlarged end portions 234a2 and 234b2 of the lateral slots 234a-b of the collar 230.

While the collar 230 is positioned in its locked end of travel position as shown, the main body 235 of the collar 230 circumferentially encompasses the collet end portion 126 of the female coupling 120. Accordingly, the main body 235 of the collar 230 provides radial reinforcement to keep the inwardly extending radial projections 127 of the collet end portion 126 of the female coupling 120 seated in the circumferential recess 216 of the male coupling 210.

In addition, while the collar 230 is positioned in its locked end of travel position as shown, the spring projections 236 of the collar 230 are releasably engaged within the circumferential groove 219 of the male coupling 210. In some embodiments, the spring projections 236 of the collar 230 mechanically snap into the circumferential recess 216 of the male coupling 210, and an audible snap noise is created that provides a user with feedback indicating that the pre-coupled configuration has been properly made.

In some embodiments, the female coupling 120 is rotatable in relation to the male coupling 210 while the fluid coupling 200 is in the coupled configuration. That is, in some embodiments the female coupling 120 can be rotated 360° about the longitudinal axis 211 of the male coupling 210 while the fluid coupling 200 remains in the coupled configuration. In some embodiments, it is not possible for such rotation to take place, or only a limited degree of rotation can take place.

Figure 38:
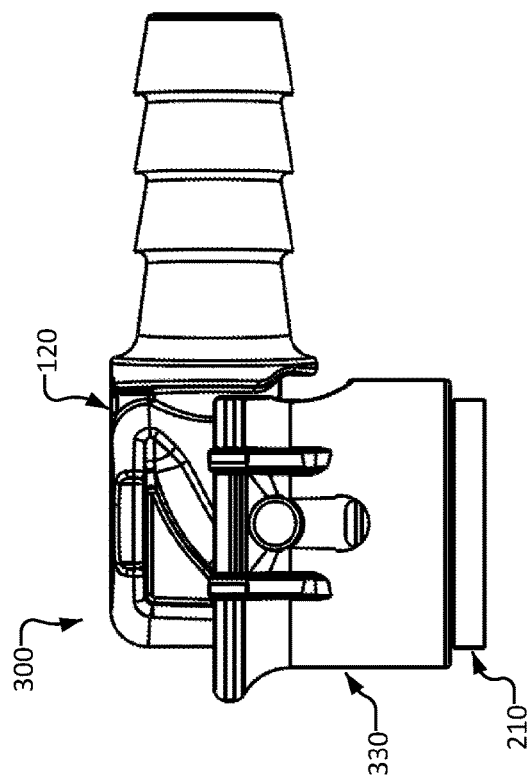
FIG. 38 is a side view of the arrangement of FIG. 37.
Figure 39:
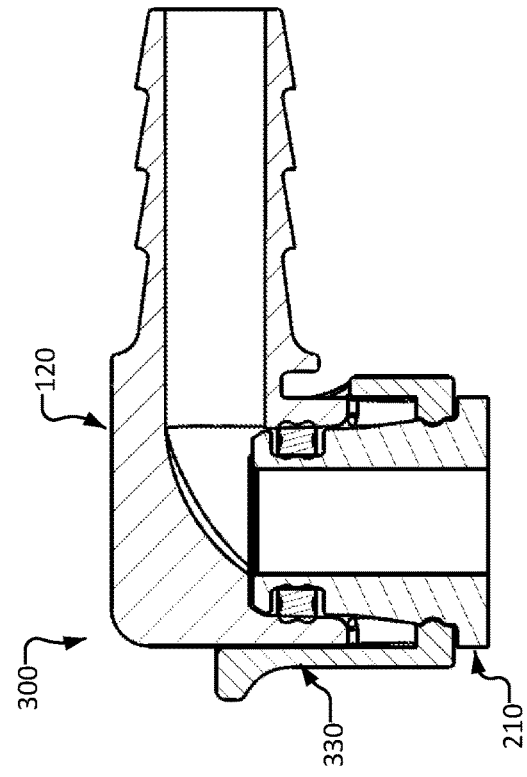
FIG. 39 is a longitudinal cross-sectional view of the arrangement of FIG. 37.
Figure 37:
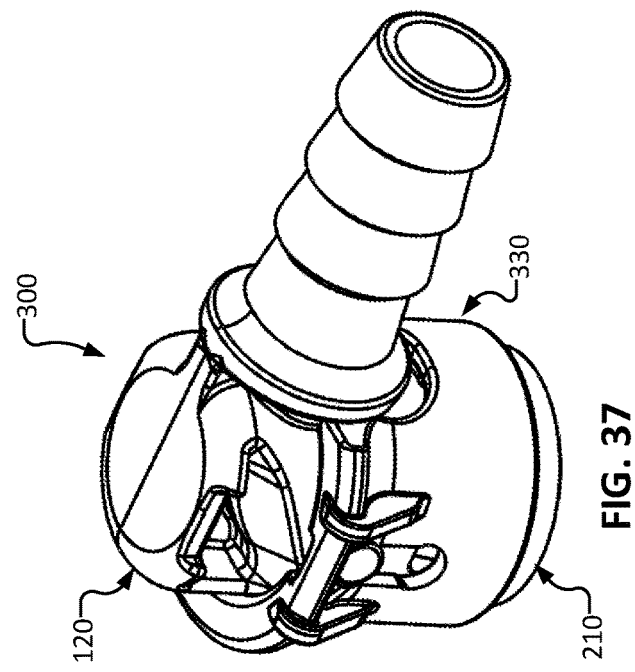
FIG. 37 is a perspective view of the fluid coupling of FIG. 19 with the alternative collar of FIG. 27.

FIGS. 37-39 show an example fluid coupling 300 that includes the alternate collar 330 (as shown in FIGS. 27-29). Here the fluid coupling 300 is shown in its coupled configuration in which the fluid coupling 300 is operative and fully ready for use. In the coupled configuration, the male coupling 210 and female coupling 120 are engaged with each other, while the collar 330 is positioned in its locked end of travel position relative to the female coupling 120.

In the locked orientation, the radial projections 125a-b of the female coupling 120 are positioned in the second enlarged end portions 334a2 and 334b2 of the lateral slots 334a-b of the collar 330.

While the collar 330 is positioned in its locked end of travel position as shown, the main body 335 of the collar 330 circumferentially encompasses the collet end portion 126 of the female coupling 120. Accordingly, the main body 335 of the collar 330 provides radial reinforcement to keep the inwardly extending radial projections 127 of the collet end portion 126 of the female coupling 120 seated in the circumferential recess 216 of the male coupling 210.

In addition, while the collar 330 is positioned in its locked end of travel position as shown, the projections 236 of the collar 330 are releasably engaged within the circumferential groove 219 of the male coupling 210. In some embodiments, the projections 336 of the collar 330 mechanically snap into the circumferential recess 216 of the male coupling 210, and an audible snap noise is created that provides a user with feedback indicating that the pre-coupled configuration has been properly made.

In some embodiments, the female coupling 120 is rotatable in relation to the male coupling 210 while the fluid coupling 300 is in the coupled configuration. That is, in some embodiments the female coupling 120 can be rotated 360° about the longitudinal axis 211 of the male coupling 210 while the fluid coupling 200 remains in the coupled configuration. In some embodiments, it is not possible for such rotation to take place, or only a limited degree of rotation can take place.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various modules and components in the embodiments described herein should not be understood as requiring such separation in all embodiments, and it should be understood that the described components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A fluid coupling comprising:
   a male coupling defining a longitudinal axis, a seal groove, and a circumferential recess facing radially outward, the male coupling comprising a seal disposed in the seal groove;
   a female coupling defining an internal space configured to receive a portion of the male coupling, the female coupling including an end portion comprising a collet structure with radially inward-extending projections; and
   a collar defining a central open space, the collar engaged with the female coupling and slidable thereon between: (i) an unlocked end of travel position in which the collet structure is longitudinally extending outside of the central open space of the collar and (ii) a locked end of travel position in which the collet structure is within the central open space of the collar, the collar including radially inward-extending projections,
   wherein, while the male coupling is coupled with the female coupling and the collar is in the locked end of travel position, the radially inward-extending projections of the female coupling and the radially inward-extending projections of the collar are releasably seated in the circumferential recess of the male coupling.

2. The fluid coupling of claim 1, wherein the radially inward-extending projections of the collar are spring projections configured to be radially deflectable.

3. The fluid coupling of claim 1, wherein the female coupling includes a radial projection and the collar defines a lateral slot in which the radial projection is slidably disposed.

4. The fluid coupling of claim 3, wherein the radial projection is at a first end of the lateral slot when the collar is in the unlocked end of travel position, and wherein the radial projection is at a second end of the lateral slot when the collar is in the locked end of travel position.

5. The fluid coupling of claim 1, wherein the male coupling has a mid-body portion with an outer diameter that is larger than an outer diameter of the seal.

6. The fluid coupling of claim 5, wherein at least a portion of the mid-body portion is frustoconical shaped.

7. A fluid coupling comprising:
a female coupling defining an internal space configured to receive a portion of a male coupling, the female coupling including an end portion comprising a collet structure with radially inward-extending projections; and
a collar defining a central open space, the collar engaged with the female coupling and slidable thereon between: (i) an unlocked end of travel position in which the collet structure is longitudinally extending outside of the central open space of the collar and (ii) a locked end of travel position in which the collet structure is within the central open space of the collar, the collar including radially inward-extending projections,
wherein the collar defines a transverse slot through which a portion of a termination end portion of the female coupling can movably extend.

8. The fluid coupling of claim 7, wherein the female coupling includes a radial projection and the collar defines a lateral slot in which the radial projection is slidably disposed.

9. The fluid coupling of claim 8, wherein the radial projection is at a first end of the lateral slot when the collar is in the unlocked end of travel position, and wherein the radial projection is at a second end of the lateral slot when the collar is in the locked end of travel position.

10. The fluid coupling of claim 8, wherein the lateral slot is dog bone shaped or barbell shaped.

11. The fluid coupling of claim 7, wherein the collar further comprises stop members that contact the female coupling while the collar is in the unlocked end of travel position such that the radially inward-extending projections of the collar are spaced apart from the female coupling.

12. The fluid coupling of claim 7, wherein the radially inward-extending projections of the collar are spring projections configured to be individually radially deflectable.

13. The fluid coupling of claim 12, wherein the collar includes four of the radially inward-extending projections that are configured to be individually radially deflectable.

14. A fluid coupling comprising:
a male coupling having a first end portion and defining:
a longitudinal axis;
a circumferential recess facing radially outward; and
an annular groove facing longitudinally toward the first end portion;
a female coupling defining an internal space configured to receive at least the first end portion of the male coupling, the female coupling including an end portion comprising a collet structure with radially inward-extending projections; and
a collar defining a central open space, the collar engaged with the female coupling and slidable thereon between: (i) an unlocked end of travel position in which the collet structure is longitudinally extending outside of the central open space of the collar and (ii) a locked end of travel position in which the collet structure is within the central open space of the collar, the collar comprising longitudinally extending projections configured to engage in the annular groove of the male coupling when: (i) the male and female couplings are in a coupled configuration and (ii) the collar is in the locked end of travel position, and
wherein, while the male and female couplings are in the coupled configuration, the radially inward-extending projections of the female coupling are seated in the circumferential recess of the male coupling.

15. The fluid coupling of claim 14, wherein the female coupling includes a radial projection and the collar defines a lateral slot in which the radial projection is slidably disposed.

16. The fluid coupling of claim 15, wherein the radial projection is at a first end of the lateral slot when the collar is in the unlocked end of travel position, and wherein the radial projection is at a second end of the lateral slot when the collar is in the locked end of travel position.

17. The fluid coupling of claim 16, wherein the lateral slot is dog bone shaped or barbell shaped.

* * * * *